Dec. 16, 1930.                    LE ROY W. WILLIS                    1,785,607
                         METAL POT FOR LINE CASTING MACHINES
                          Filed July 5, 1929        2 Sheets-Sheet 1
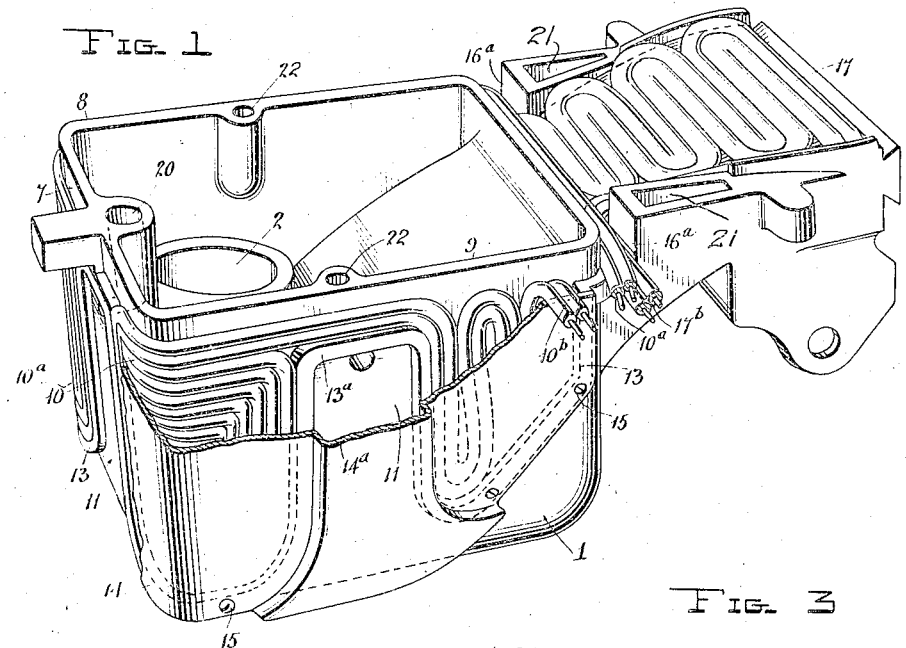
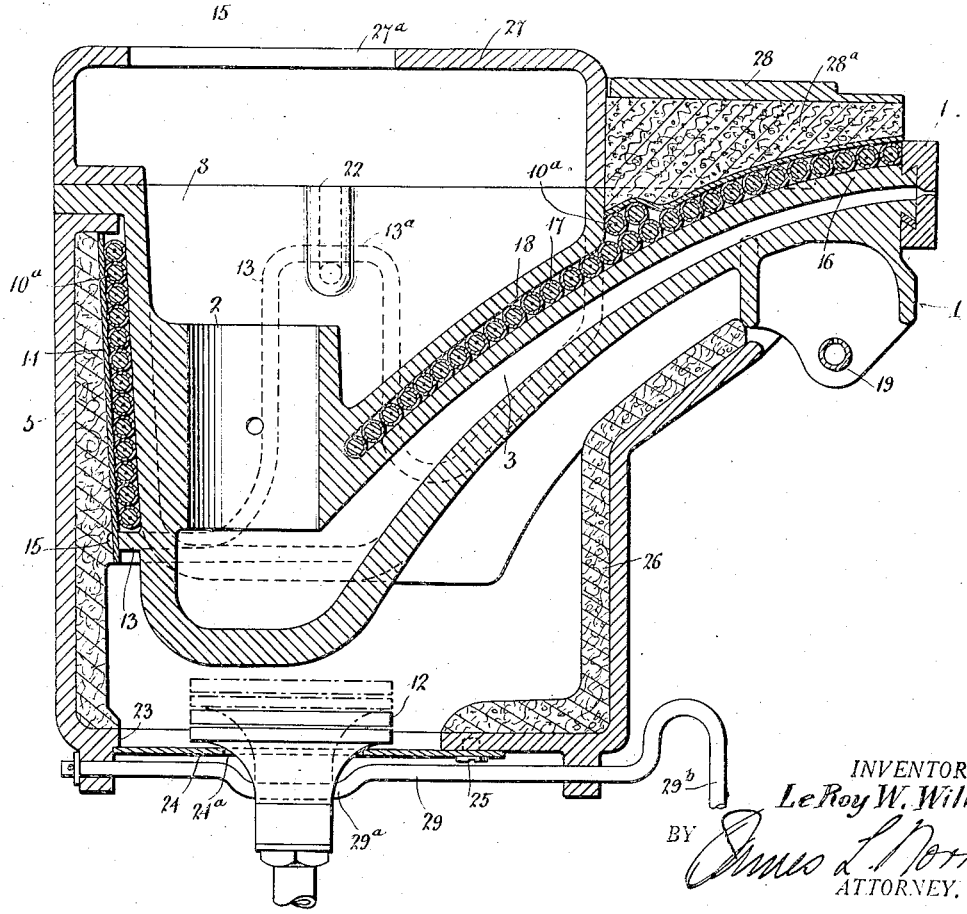
INVENTOR.
LeRoy W. Willis,
BY
ATTORNEY.

Dec. 16, 1930. LE ROY W. WILLIS 1,785,607
METAL POT FOR LINE CASTING MACHINES
Filed July 5, 1929 2 Sheets-Sheet 2
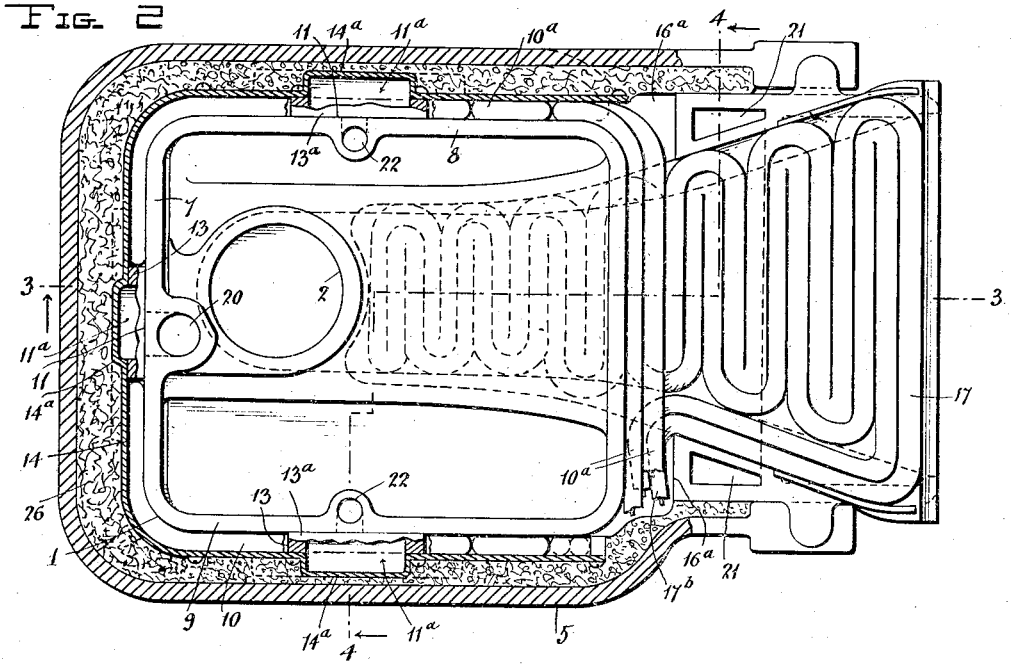
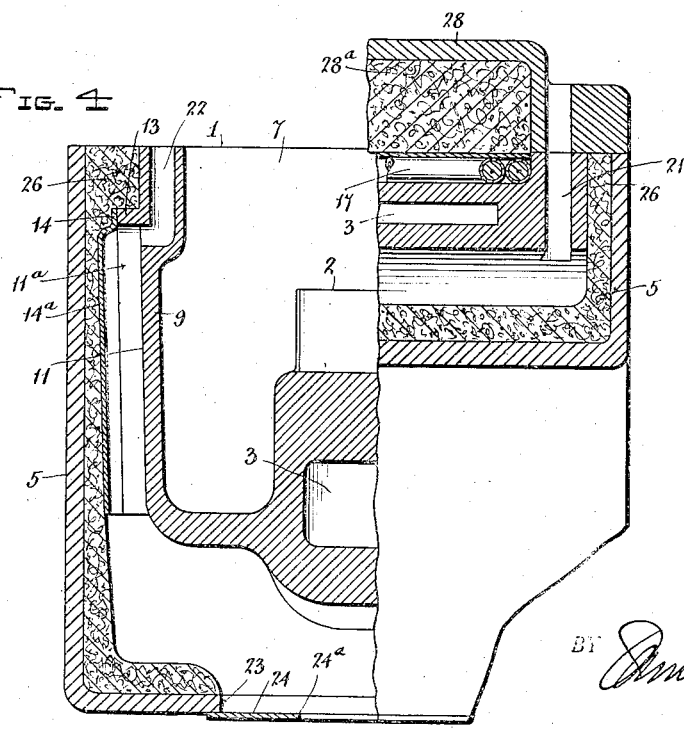
INVENTOR.
LeRoy W. Willis,
ATTORNEY Patented Dec. 16, 1930

1,785,607

UNITED STATES PATENT OFFICE

LE ROY W. WILLIS, OF BROOKLYN, NEW YORK, ASSIGNOR TO INTERTYPE CORPORATION, OF NEW YORK, N. Y., A CORPORATION OF NEW YORK

METAL POT FOR LINE-CASTING MACHINES

Application filed July 5, 1929. Serial No. 376,173.

The present invention relates to metal pots or crucibles of the kind used for melting type metal employed for casting type bars or slugs in line casting machines of the general class shown and described in United States Patent Number 436,532 granted on September 16, 1890, to O. Mergenthaler, and it relates more particularly to improvement in the means for heating such pots, whereby more efficient heating surfaces are provided for the application of gas or electric heating agents.

The broad object of the invention is to allot portions of the available surface of the metal pot to more than one heating means so as to provide highly efficient application of heat energy from one or another source or from both sources at the same time, and to accomplish this result by a novel arrangement of the respective heating surfaces whereby obstruction of the heating surface allotted to one heating means by the heating surface allotted to the other heating means is avoided, to the end that heat from one or the other source may be applied to the respective heating surfaces, or to both heating surfaces at the same time, without requiring alterations or changes in order to prepare either of the heating surfaces for heating either independently or simultaneously.

More particularly, the object of the invention is to provide for the simultaneous application of heat from different sources, all exteriorly of the type metal within the metal pot, and in so doing to dispose, heat-insulate and vent the surfaces of the pot exposed to each source of heat in such a manner that one or the other source alone will heat with maximum efficiency and the surface not being heated at the time will not impair the efficiency of the operating source through excessive heat-radiation losses or cooling by circulating air currents from vent passages.

To these and other ends, the invention consists in certain improvements and combinations and arrangements of parts, all as will be hereinafter described, the features of novelty being pointed out particularly in the claims at the end of this specification.

In the accompanying drawings:—

Figure 1 is a perspective view, with portions broken away, of the improved metal pot showing portions of the electrically and the gas heated surfaces and the electric heating units;

Figure 2 is a top plan view of the metal pot shown in Fig. 1, showing the metal pot placed within the usual jacket, the jacket and the enclosing casing for the electrically heated surfaces of the pot being shown in horizontal section;

Figure 3 represents a vertical section through the metal pot and its jacket taken on the line 3—3 of Fig. 2; and Figure 4 represents a transverse vertical section taken through the metal pot and its jacket on the line 4—4 of Fig. 2.

Similar parts are designated by the same reference characters in all of the figures.

Metal pots or crucibles embodying the present invention are applicable generally to typographical machines of the general class in which type or type slugs are cast by injecting molten metal into a mold, the metal pot shown in the present instance being adapted for the casting of type bars or slugs in machines of the general class shown and described in the patent hereinabove referred to.

The improved metal pot, as shown, comprises a main reservoir, 1 adapted to contain a supply of type metal, a cylinder 2 arranged within the main reservoir and adapted to contain a plunger which is operative by mechanism well known in machines of this class to force molten metal received beneath the plunger through the throat 3 and a mouthpiece 4 on the upper end of the throat into the usual mold, the front of which is closed by a line of matrices, the molten type metal thus injected into the mold effecting the casting of the type bar or slug therein, as is well known to those skilled in the art. The metal pot is mounted usually within a jacket 5 which is supported on legs so that the jacket together with the metal pot may move forwardly into contact with the rear face of the mold at appropriate intervals as is usual in machines of this class.

Heretofore, in order to melt the type metal in the metal pot and to maintain it in a molten condition and at the proper temperature, it has been the usual practice to provide the metal pot with only one source of heat energy and to accommodate the heating surface for such source of heat energy to the vent means and the heat-insulating packing and the means for mounting the pot in the pot jacket. It has also been proposed to provide metal pots of this class with means for supplying heat thereto from two different sources of heat energy, and to provide automatic switching mechanisms whereby the pot might be heated from one or the other source. Such pots however using, for instance, electric heating means as one source of heat have resorted to applying such heating means within the metal reservoir in contact or associated with metal in the reservoir which is objectionable because of the difficulty of removal of the heating units, splashing of metal on terminals and overheating of the metal in spots. It has further been proposed to apply electric heating means on the outside of the pot so that the heating units could be removed and gas heat, for example, substituted, but this also is objectionable because of the time required to complete the change over from one source of heat to another.

The use of only one source of heat energy for heating the metal pot presents the disadvantage that it requires considerable time to melt the type metal and to bring it up to the desired casting temperature from the cold and solidified state, the setting of the machine into operation being thereby delayed. Furthermore, when only one source of heat energy is relied upon to melt and maintain the metal in a molten state, the serviceability of the line casting machine employing such a metal pot is subject to discontinuance or complete shutdown in the event such source of heat energy should fail. It will therefore be apparent that a metal pot always equipped for heating from two sources of energy, such as gas and electricity, and designed and mounted so that either source of energy will be able to heat the metal pot with substantially the same efficiency and in which both sources are immediately available at all times without requiring any alterations or changes of the metal pot or its mounting or its heat-insulating means, or of either heating means, will be of great practical utility.

It is believed the present invention provides for the first time a practical means of utilizing two sources of heat energy for metal pots used in line casting machines wherein both sources of energy are applied entirely exteriorly of the metal in the pot and wherein the disposition of the surfaces for the respective sources of heat is such as to give substantially equal operating efficiency for either source alone and wherein the sources of heat are always available at once to operate simultaneously or independently without change or interference.

The present invention provides a metal pot which, in general, may be of the form usually used in line casting machines but wherein certain portions of the available heating surfaces exteriorly of the type metal are allotted to one source of heat energy and other portions of such available heating surfaces are allotted to another source of heat energy, the areas of the respective heating surfaces thus allotted being equally effective for heating the metal pot, and the construction and arrangement of the metal pot and its heating surfaces are such that either source of heat energy is ready for use immediately and efficiently without interference from the heating arrangement for the other source of heat energy, and both sources of heat energy may be used at the same time and without one interfering with the other and without setting up undue stresses in the material composing the metal pot. The ability to operate from one source of heat energy or the other source immediately enables the line casting machine to continue in service, notwithstanding that the supply of one or the other source of heat energy might fail, and the ability to use both sources of heat energy at the same time presents the advantage that in heating solidified metal in the metal pot to melt it and to bring it to the casting temperature, much time is saved in the starting up of the line casting machine since the metal is brought up to the casting temperature in a much shorter time than would be required if only one source of heat energy were used, although after the metal has been brought up to the casting temperature, the supply of heat energy from one of the sources may be discontinued in the interest of economy and the metal may be maintained at the casting temperature by a continuance of the supply of the other source of heat energy to the metal pot.

The exterior location and arrangement of the heating surfaces on the metal pot is of importance, since in metal pots as commonly used, if too much heat is applied to one portion of the heating surface of the metal pot, the solidified metal therein will melt quickly in one place while it remains solidified and fused to the walls of the metal pot, resulting in the setting up of great stresses in the cast iron walls of the metal pot due to the expansion of the trapped molten portion of the type metal, these stresses sometimes causing the metal pots to crack or break and thus become useless. The present invention avoids such difficulties by providing a novel distribution of the heating surfaces through which the sources of heat energy are applied to the metal pot, these heating surfaces being so arranged that the type metal, as it melts, will be caused to flow out from the mass of solidified type metal.

Further, the present invention provides a novel arrangement of the vent openings for the gas heat wherein drafts of air required for combustion atmosphere for the gas are in operative condition at all times if gas is in use but upon throwing the gas burner out of service, such drafts are checked off and the electric heating efficiency remains unimpaired, the details of this feature being hereinafter described.

In the preferred construction shown in the present instance, the major portions of the rear wall 7 and the two side walls 8 and 9 of the main reservoir 1 are utilized as heating surfaces for electric heating coils or other electric heating elements 10, 10 respectively which may be connected in any suitable or well known way to a source of electric current, while the bottom of the main reservoir and the areas 11 of the rear wall 7 and side walls 8 and 9 are utilized as heating surfaces to receive heat from a gas burner 12 placed beneath the metal pot and which may be of the usual form and supplied with gas in the usual way.

The electric heating elements are preferably supported in proper position against the walls of the main reservoir by a flange 13 which extends outwardly around the lower edge of the main reservoir at the rear and the two sides thereof, the flange having at the sides of the main reservoir and at the rear thereof portions 13$^a$ which extend upwardly around and over the top of the gas heating surface 11 at each side and at the rear of the main reservoir. The electric heating coils or elements are enclosed and thus protected from the effects of the heat and gases from the gas burner by a casing 14 which may be formed of sheet metal and extended around the electric heating elements so as to form pockets which enclose them, this casing fitting tightly against and being secured to the flange 13 by screws 15 or other suitable means. The electric heating elements cover the rear and side walls of the main reservoir, except for the gas heating surfaces 11, so that the surrounding walls of the main reservoir of the metal pot will receive heat substantially throughout their areas from the electric heating elements, and the heat thus supplied to the metal pot will melt the type metal first where the type metal is in contact with the surrounding walls of the main reservoir, thus detaching the type metal from the walls of the metal pot and avoiding the creation of stresses in the walls of the metal pot due to expansion of the molten metal.

In addition to the surfaces thus provided at the two sides and the rear of the main reservoir for electrically heating it, the upper wall 16 of the metal injecting throat 3 is made thin or of reduced thickness to insure efficient heat conduction therethrough and the upper side of this wall forms an electric heating surface to which is applied an electric heating unit or element 17, and a pocket 18 is formed in the portion of the wall 16 which is within the main reservoir of the metal pot, this pocket extending below the type metal level in the main reservoir and terminating at a point adjacent to the wall of the cylinder 2, this pocket containing a portion of the electric heating element 17. It will thus be seen that an electric heating surface is provided for the entire length of the throat portion of the metal pot which will serve to quickly melt the type metal contained therein and maintain the metal injecting throat and the type metal therein at the proper temperature, and, furthermore, the portion of the electric heating element 17 which extends into the pocket 18 will act to quickly heat the walls of this pocket which are below the level of the type metal in the main reservoir, thus melting the portion of the type metal in the main reservoir which is in contact with these walls of the pocket or of the metal injecting throat and thereby avoiding the setting up of stresses in these portions of the metal pot due to expansion of the molten metal. By forming the upper wall 16 of the metal injecting throat of relatively small thickness, quick penetration of heat from the electric heating element 17 to the type metal within the throat is accomplished, notwithstanding the location of the electric heating element above rather than beneath the throat.

The depressed channels 16$a$ are provided so as to allow the terminal ends 10$a$ of the electric heating element for the side wall 8 and the terminal ends 17$^b$ of the throat electric heating element 17 to pass through and locate alongside of the terminal ends 10$^b$ of the electric heating element for the side wall 9.

The metal pot is exposed over its bottom surface and upwardly along the underside of its throat portion for the application of heat from the gas burner 12, and the usual pot mouth gas burner 19 may be provided for heating the upper end of the throat and the mouthpiece thereon, and the metal pot is provided with a vent 20 which extends from about midway up the surface 11 on the rear wall of the metal pot upwardly to the top of the pot, and with additional vents 21 which extend upwardly through the side walls of the throat to insure proper combustion of the gas and the escape of the products of combustion therethrough. The surfaces 11 which extend upwardly at the back 7 and the sides 8 and 9 of the main reservoir provide additional gas heating surfaces which serve to heat the side walls of the main reservoir, these surfaces receiving heated gases from the bottom of the pot and being enclosed by the flange portions 13ª and by outwardly offset portions 14ª of the casing 14, pockets or flues 11ª which are separated from the pockets containing the electric heating elements being thus formed at the rear and sides of the main reservoir for the products of combustion from the gas burner, and these products of combustion are discharged from these pockets by the vent 20 and by the vents 22 which extend inwardly from the surfaces 11 in the respective sides of the pot and thence upwardly within the respective side walls of the metal pot.

To provide for utilizing the maximum available surface on the walls of the pot for gas heating, the flanges 13 which divide off the electric heating surfaces are curved in form and thus correspond exactly to the shape of the coil-wire electric elements although it will be understood that the present invention contemplates the use of either coils or flat plate types of electric elements, which may in any case be of curved formation if desired.

The metal pot is mounted within the jacket 5, the jacket having an opening 23 in its bottom through which the gas burner 12 may project, and a cover plate 24 is mounted by a screw 25 on the bottom of the jacket so that when the metal pot is heated by the electric heating means, the cover plate will serve to cut off the entrance of air to the bottom of the pot which would tend to cool it, the cover plate however, admitting sufficient air to the gas burner 12 to support combustion of the gas fuel when gas heat is being used. In the preferred means of employing the cover 24 to shut off the entrance of air when the gas burner is not in use, the gas burner 12 is mounted on a rod 29 having an eccentric offset portion 29ª to carry the burner, as shown in Fig. 3. The cover 24 has an opening 24ª to fit around the tapered burner neck and the screw 25 holds the cover in place. By turning the handle 29ᵇ of rod 29, the burner will be raised or lowered as indicated by the dotted and full lines respectively, the burner being flexibly connected to the gas supply pipe, as will be clearly understood, and the burner will assume the position, shown in full lines when gas is not in use so that the larger diameter of the neck of the burner acts as a plug to close the opening 24ª. When the gas burner is in use it will assume the raised position shown in dotted lines and air for combustion of the gas can enter through the opening 24ª, since the smaller diameter of the tapered burner neck is then within said opening. The space between the metal pot and the enclosing jacket is filled by an asbestos or other heat insulating packing 26, excepting the spaces opposite to the gas heating surface 11 at the sides of the metal pot where the packing is reduced in thickness to accommodate the pockets or flues which receive the products of combustion from the gas burner beneath the metal pot, the outwardly offset portions 14ª of the casing 14 excluding the heat insulating packing from these pockets.

The present pot is preferably provided with a two piece cover, the cover section 27 being used for the main reservoir and containing an opening 27ª provided with the usual pivoted door for use in adding fresh metal to the pot, while the cover section 28 is packed with insulating material 28ª and encloses the portion of the electric heating element 17 which lays exposed on top of the metal injecting throat beyond the main reservoir. The cover 28 is thereby easily removable for access to the heating element 17 when necessary without removal of the entire cover from the pot.

It will be apparent from the foregoing description that the combined electrically and gas heated surfaces are substantially coextensive with the areas of the surrounding or exterior walls of the main reservoir, so that the type metal therein, when heated by these surfaces, will melt first where it is in contact with the walls of the reservoir and hence the reservoir walls will not be subjected to stresses due to the expansion of the molten type metal since this molten portion of the type metal will be free to expand. Moreover, the provision of electrically and gas heated surfaces which are substantially coextensive with the length of the metal pot throat insures quick melting of all of the type metal contained therein, and enables sensitive and exact regulation of the casting temperature thereof.

Since both electrically and gas heated surfaces are provided exteriorly of the walls of the main reservoir and throughout the length of the metal injecting throat, the type metal, after being melted and raised to the desired casting temperature, may be efficiently maintained at such temperature by either the electrically heated surface or the gas heated surfaces, thus enabling one of the sources of heat energy to be cut off and thereby economizing in the cost of operation, or when only one source of heat is available, the type metal may be melted and brought up to the desired casting temperature as well as maintained at such temperature by the use of only one of the sources of heat, the distribution and apportionment of the electrically and gas heated surfaces being such that they are substantially equally effective in heating the metal pot and its throat.

While the invention thus provides dual means for heating the metal pot, each heating means is capable of performing its intended function without interference from the other. The electric heating means for the walls of the main reservoir cover the major portion of the exterior area of these walls, but sufficient exterior areas of the walls are apportioned as gas heated surfaces to insure effective heating of the reservoir by gas heat, and there will be no interference between the electric heating means and the gas heating means since the respective surfaces heated thereby are separate and the electric heating elements are encased and thus protected from the products of combustion from the gas burner.

I claim as my invention:—

1. A metal pot for line casting machines comprising a main reservoir, a metal discharging cylinder therein, a metal injecting throat leading from said cylinder through a portion of such reservoir and to the exterior thereof, the entire upper wall of said throat, including a portion thereof within the reservoir, being relatively thin and having a heating surface on its upper side which extends from said cylinder to the discharge mouth of the throat, and electric heating means mounted upon the upper side of said heating surface and extending throughout the length thereof.

2. A metal pot for line casting machines comprising a main reservoir, a metal discharging cylinder therein, and a metal injecting throat leading from said cylinder, a portion of the upper wall of the throat within the main reservoir and adjacent to said cylinder being formed with a pocket and the upper face of said upper wall forming a heating surface which leads from said cylinder to the discharge mouth of the throat, and electric heating means for said heating surface of the throat, said electric heating means being partially contained in said pocket.

3. A metal pot for line casting machines comprising a main reservoir having heating surfaces on its rear and side walls, electric heating means cooperative with said walls of the main reservoir, a throat leading upwardly and forwardly from said main reservoir, a pocket being formed in a portion of the upper wall of the throat which is within the main reservoir, and electric heating means contained in said pocket.

4. A metal pot for line casting machines comprising a main reservoir, gas heating means below said reservoir, electric heating means cooperative with the exterior surfaces of the surrounding walls of said reservoir, and gas heated passages extending upwardly exteriorly of other portions of said walls and having vents leading from their upper ends for the discharge of products of combustion.

5. A metal pot for line casting machines comprising a main reservoir, gas heating means below said reservoir, electric heating elements mounted against the exterior surfaces of portions of the surrounding walls of said reservoir, gas heated passages extending upwardly exteriorly of other portions of said walls and having gas discharge vents at their upper ends, and a casing enclosing said electric heating elements and separating them from said gas heated passages.

6. A metal pot for line casting machines comprising a metal reservoir having an exterior flange which projects outwardly from its surrounding walls at their lower edges and having upwardly offset portions which form gas passages leading from the bottom of the reservoir, gas heating means below the reservoir, a casing enveloping the reservoir and secured to said flange, said casing being spaced from the walls of the reservoir, by said flange, and electric heating units contained in the space between said casing and the walls of the reservoir, the upwardly offset portions of said flange separating the electric heating units from said gas passages.

7. A metal pot for line casting machines comprising a metal reservoir having an exterior flange projecting outwardly from its lower portion, the flange having upwardly offset portions at the sides of the reservoir which form gas heating passages leading from the bottom of the reservoir, gas heating means below the reservoir, a casing secured to said flange and spaced thereby from the walls of the reservoir to form pockets, electric heating units contained in said pockets, the portions of the casing adjacent to said upwardly offset portions of the flange being out-turned to form walls of said gas heating passages, and a jacket enclosing the walls of the reservoir and closing the outer sides of said gas heating passages.

8. A metal pot for line casting machines comprising a reservoir for type metal, and gas heating means and electrical heating means simultaneously applied to the reservoir wholly exteriorly of the type metal therein, the surrounding walls of the reservoir having relatively separated pockets which are allotted to the gas heating means and the electrical heating means respectively.

9. A metal pot for line casting machines comprising a reservoir for the type metal, gas and electrical heating means located wholly exteriorly of the reservoir, different areas of the exterior surfaces of the surrounding walls of the reservoir being exposed to the heating effect of the gas and electrical heating means respectively, and means for dividing off the areas exposed to one of said heating means from the areas exposed to the other heating means.

10. The combination of a metal pot for line casting machines comprising a reservoir for type metal and an enclosing jacket having an opening in its bottom, electrical heating means for the metal pot, and a gas burner for also heating the metal pot, said gas burner being movably mounted in said opening in the jacket and operative, when in one position, to admit air through said opening to the burner and, when in another position, to cut off admission of air through said opening into the jacket.

In testimony whereof I have hereunto set my hand.

LE ROY W. WILLIS.